United States Patent [19]
Switsen

[11] 3,728,610
[45] Apr. 17, 1973

[54] CONSTANT POWER REGULATOR FROM AC SOURCE

[76] Inventor: Henry N. Switsen, 11319 Vanowen St., North Hollywood, Calif. 91605

[22] Filed: Sept. 21, 1970

[21] Appl. No.: 73,942

[52] U.S. Cl. ..................321/47, 307/103, 321/15
[51] Int. Cl. .............................................H02m 7/20
[58] Field of Search....................307/98, 99, 103; 321/15, 20, 24, 43, 47; 323/7, 17, 36, 45

[56] References Cited

UNITED STATES PATENTS

| | | | |
|---|---|---|---|
| 3,113,259 | 12/1963 | Walker | 321/24 |
| 2,693,535 | 11/1954 | White | 321/15 X |
| 3,470,444 | 9/1969 | Bixby | 321/20 X |
| 3,461,378 | 8/1969 | King | 323/45 X |
| 3,508,112 | 4/1970 | Peek | 323/45 X |

*Primary Examiner*—A. D. Pellinen

[57] ABSTRACT

A circuit for supplying a consant power to a load from an AC source that may vary in voltage, including a diode connecting the AC source to the load to directly supply power during part of the positive half cycle, and a silicon controlled rectifier (SCR) that supplies power from a capacitor to the load during another part of each cycle. The capacitor is charged to a higher voltage than the AC source so that when it is connected to the load sometime during the positive half cycle it stops the direct flow of power to the load through the diode and the capacitor then supplies a fixed power. A circuit that senses the AC voltage will fire the SCR later in the positive half cycle when the AC source voltage rises, so that more power can flow to the load directly through the diode prior to connection of the capacitor.

10 Claims, 7 Drawing Figures

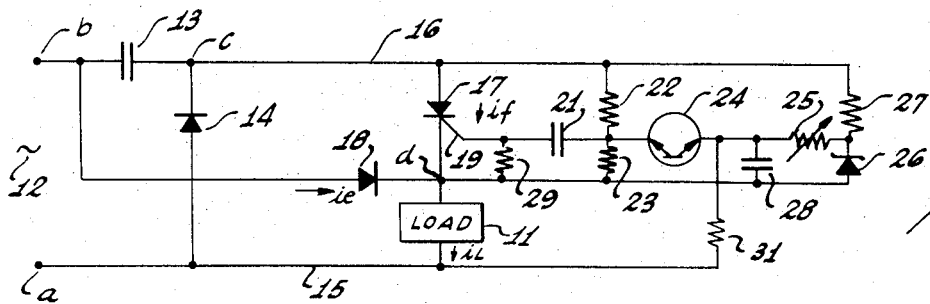
Fig. 1
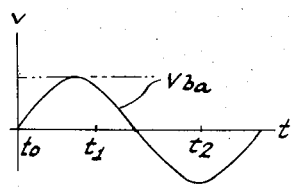
Fig. 2
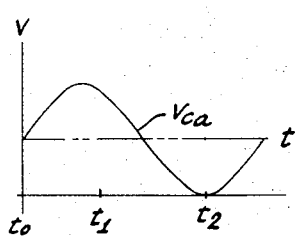
Fig. 3
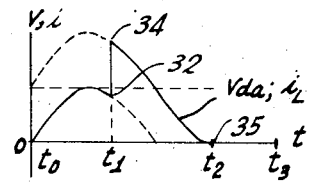
Fig. 4
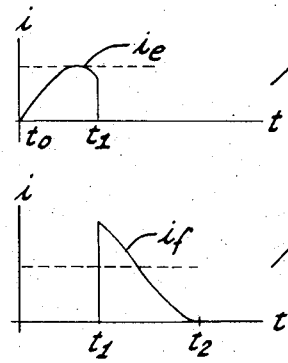
Fig. 5
Fig. 6
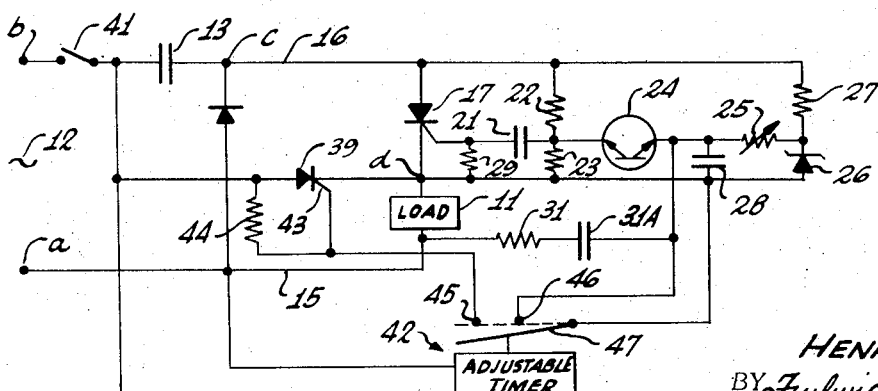
Fig. 7
INVENTOR.
HENRY N. SWITSEN
BY Fulwider, Patton, Rieber,
Lee, and Utecht
ATTORNEYS 3,728,610

CONSTANT POWER REGULATOR FROM AC SOURCE

BACKGROUND OF THE INVENTION

1. This invention relates to a system for supplying constant power to a load from an alternating current source regardless of fluctuations in the voltage of the source.

2. Constant voltage regulators are well known in the electrical art but have in the past involved complicated and expensive electronic circuitry or special transformer constructions which have required massive quantities of iron in magnetic circuits. The use of capacitors in parallel with the source, with gates connecting them to the load at a predetermined point in the alternating current cycle are also known in the art. However, none of these prior attempts have been characterized by the simplicity, economy and accuracy of the power regulating system of the present invention.

SUMMARY OF THE INVENTION

The primary components of the power regulating system of the present invention comprise a voltage boosting means for increasing the voltage of the alternating current source, controlled rectifier for connecting the boosted voltage to the load control circuit for triggering the controlled rectifier to conduct at a regulated point in the alternating current cycle, and a rectifier, controlled or uncontrolled, for feeding the load directly from the alternating current source from the beginning of the cycle until the point therein at which the boosted voltage is connected to the load.

Where the voltage boosting means is a series capacitor, the circuit also includes a rectifier diode for charging the capacitor during the negative portion of the alternating current cycle. When the rectifier connecting the load directly to the alternating current source is a controlled rectifier, the system may include a timing circuit for terminating the power supplied to the load after a predetermined set interval.

The control circuit for triggering the controlled rectifier from the voltage boosting means preferably times the triggering point in response to variations in the supply voltage and includes adjustable means for setting the power to which the system regulates.

The supply of power from the alternating current source directly to the load may vary from zero to one-half cycle of the supply. The supply of power to the load from the voltage boosting means may vary from zero to nearly a full cycle. The combined power supplied directly from the source and from the voltage boosting means may vary from one-half cycle to three-quarters of a cycle for a typical circuit. Power cannot be supplied directly from the source to the load while power is being supplied from the voltage boosting means to the load.

DESCRIPTION OF THE DRAWING

FIG. 1 is a wiring diagram showing the basic power regulating system according to the present invention;

FIG. 2 is a trace of one cycle of the supply voltage;

FIG. 3 is a trace of one cycle of the voltage across the voltage boosting means;

FIG. 4 is a trace of the controlled voltage across the load and of the current supplied to a resistance load;

FIG. 5 is a trace of the current supplied to the load directly from the source;

FIG. 6 is a trace of the current supplied to the load from the voltage boosting means;

FIG. 7 is a wiring diagram of the power regulating system including time-control cutoff means.

DESCRIPTION OF THE PREFERRED EMBODIMENTS

In the circuit of FIG. 1, a load 11 is fed from an alternating current source 12 applied to circuit points $a$ and $b$. A voltage boosting capacitor 13 is connected in series with circuit point $b$ and a capacitor-charging diode rectifier 14 is connected from circuit point $a$ to the side of capacitor 13 remote from point $b$, at point $c$. The line from circuit point $a$ is designated 15 and the line from circuit point $c$ is designated 16. The load 11 is connected between lines 15 and 16 in series with a silicon controlled rectifier 17. Circuit point $b$ is connected to the side of the load remote from line 15 by a rectifier shown as a simple diode 18 in FIG. 1 and as a three element, controlled rectifier such as an SCR 39 in FIG. 7, to be later described. The point at which rectifiers 17 and 18 connect to the load 11 is designated $d$. The current through the load 11 is designated by an arrow $i_L$, the current through the controlled rectifier 17 is designated by an arrow $i_f$ and the current through rectifier 18 is designated by an arrow $i_e$.

The circuit to the right of the silicon controlled rectifier 17 in FIG. 1 is the gate control circuit for triggering the SCR to initiate its conductivity. This circuit connects the SCR trigger electrode 19 through a capacitor 21 and the junction point between voltage dividing resistors 22 and 23 to one terminal of a diac 24. The other terminal of the diac 24 is connected through an adjustable potentiometer 25 to the junction between a zener diode 26 and a holding resistor 27 therefor. A capacitor 28 is connected from said other terminal of the diac 24 to the point $d$, and a return resistor 29 is connected between the trigger electrode 19 and the point $d$ to prevent undesired triggering of the SCR 17 from extraneous signals. A linearity resistor 31 is connected from said other terminal of the diac 24 to the line 15.

The operation of the circuit of FIG. 1 will be best understood in connection with the voltage and current diagrams of FIGS. 2 through 6. FIG. 2 shows the wave form of one cycle of the alternating current source voltage $V_{ba}$.

FIG. 3 shows the wave form of the voltage $V_{ca}$ which is the voltage of the voltage boosting capacitor 13 added to the supply voltage $V_{ba}$ and which has the effect of raising the base line of the $V_{ba}$ voltage so that the voltage $V_{ca}$ is positive for the entire cycle. If the capacitor 13 is such as to be completely charged during the half cycle of the source when the point $a$ is positive with respect to point $b$, then the capacitor 13 charges up to the full peak voltage of $V_{ba}$ and the peak of $V_{ca}$ then becomes double the value thereof.

FIG. 4 shows in full lines the wave form of the voltage $V_{da}$ across the load when the controlled rectifier 17 is triggered to conduct at time $t_1$. In the operation of the regulating system of the invention, $t_1$ can occur at any time the voltage $V_{da}$ is positive. Considering the cycle shown in FIG. 4, at time $t_o$ the diode rectifier 18 is conducting and the voltage of point $d$ follows that of the supply point $b$ so that the voltage $V_{da}$ across the load follows the curve $V_{ba}$ from time $t_o$ to time $t_1$. At time $t_1$ the controlled rectifier 17 conducts and the voltage of point $d$ is immedately elevated from point 32 to point 34 in FIG. 4 and thereafter follows the curve of the voltage $V_{ca}$ from time $t_1$ to time $t_2$. When $V_{da}$ goes to zero at time $t_2$ the controlled rectifier 17 ceases conducting and for the remainder of the cycle, from time $t_2$ to time $t_3$, voltage $V_{da}$ is zero. Since at time $t_1$ point $d$ assumes a voltage greater than that of point $b$, diode rectifier 18 is then cut off.

Assuming a purely resistive load, the current therethrough will be in phase with the voltage so the voltage curve $V_{da}$ of FIG. 4 can also represent the current curve $i_L$. That is, current will flow through the diode rectifier 18 along the curve from zero to point 32 for time $t_o$ to time $t_1$ and from point 34, along the full line curve, from time $t_1$ to time $t_2$. Thus, supply of power to the load 11 is directly from the source through the diode rectifier 18 until time point $t_1$ when the controlled rectifier 17 conducts, and thereafter power is supplied to the load from the voltage boosting capacitor 13. The power supplied to the load in the cycle shown in FIG. 4 is represented by the area under the curve 0, 32, 34, 35 which, by the circuit of this invention, is regulated to be constant regardless of variations in the voltage of the supply 12 by changing the point $t_1$ at which the controlled rectifier 17 conducts.

While this discussion has referred to regulation to constant power supplied to the load, the circuit and system of this invention will as well regulate to a constant average voltage supplied across the load for the cycle. The values to which the system regulates may be adjusted by varying the potentiometer 25.

FIG. 5 represents the current $i_e$ flowing through the diode rectifier 18 from time $t_o$ to time $t_1$ for a purely resistive load where the current follows in phase with the voltage $V_{ba}$.

FIG. 6 represents the current $i_f$ through the controlled rectifier 17 for a resistive load, from $t_1$ to time $t_2$.

It will be seen that should the source voltage call for the controlled rectifier 17 to or earlier be fired at time $t_o$ or earlier, all the current through the load will occur as $i_f$, will endure for three-fourths or more of the cycle, and in a resistive load, will be in phase with the voltage curve $V_{ca}$ until time $t_2$. If, at the other extreme, the controlled rectifier 17 is not triggered at all during the cycle, all of the current through the load will be $i_e$ through the diode rectifier 18, which, in a resistive load, will follow in phase with the first half cycle only of the supply voltage $V_{ba}$. Normally, time $t_1$ will occur sometime between these extremes so that the initial current is supplied directly from the source through the diode rectifier 18 as $i_e$, and, after the controlled rectifier 17 becomes conductive, the current suddenly increases to $i_f$ supplied from the voltage boosting capacitor 13, the rectifier 18 no longer conducting.

The point $t_1$ at which the controlled rectifier 17 becomes conductive is determined by the triggering impulse to the trigger electrode 19 from the control circuit illustrated, in accordance with the value of the supply voltage. Thus, if the supply voltage decreases, time $t_1$ automatically occurs earlier in the cycle, and if the supply voltage increases, time $t_1$ automatically comes later in the cycle. The average voltage or the power to which the circuit of FIG. 1 regulates may be adjusted by changing the value of the potentiometer 25 which controls the charging rate of the capacitor 28 and the point in the cycle time at which the diac 24 conducts.

The values of the components of circuit of FIG. 1 may be varied widely while securing the desired regulation and the following values are to be considered as but one exemplification and in no way limiting to the scope of the invention. For example, with the load 11 consuming a nominal power of 500 watts from a 115 volt AC supply, the following components and values may be used:

CAPACITORS

| | |
|---|---|
| 13 | 400 microfarad |
| 21 | 0.047 microfarad |
| 28 | 0.047 microfarad |
| 31A | 0.004 microfarad |

RESISTORS

| | |
|---|---|
| 22 | 39 K ohms |
| 23 | 6.8 K ohms |
| 25 | 50 K ohms |
| 27 | 68 K ohms |
| 29 | 330 ohms |
| 31 | 1 megohm |

RECTIFIERS

| | |
|---|---|
| 14 | 1 K watts |
| 17 | GE C106 B-1 or Motorola 2 N4442 |
| 18 | 250 watts |

DIAC

| | |
|---|---|
| 24 | Motorola MPT 28 |

ZENER DIODE

| | |
|---|---|
| 26 | 55 volts |

FIG. 7 shows a circuit quite similar to FIG. 1 but including means for terminating the supply of power to the load 11 after a predetermined variable interval. Of the parts illustrated in FIG. 1 the diode rectifier 18 has been changed to a controlled rectifier or SCR 39; manual starting switch 41 has been added to initiate the supply of power and a timing means 42 has been added to terminate the supply of power. Also the linearity control is now by a series resistor 31, capacitor 31A combination. This combination may be used in the circuit of FIG. 1, and in both FIGS. 1 and 7 a capacitor 31A may be used alone.

The silicon controlled rectifier 39 has a trigger electrode 43 which is connected through a resistor 44 to the anode to secure a firing voltage and is also connected to a stationary contact 45 of the timing switch 42. The timing switch 42 has a second stationary contact 46 connected to the junction of capacitor 28 and the diac 24, and a movable contact 47 connected to the point $d$. The timing switch 42 is shown connected to the AC source behind the switch 41 to be electrically operated therethrough and may take the form of a time delay relay motor driven switch, solid state device or any other means for timing the connecting together of the contacts 45, 46 and 47 at a predetermined and adjustable time interval after closing of the switch 41 to initiate the feeding of power to the load 11. When the contacts 45-47 are so engaged, both of the SCRs 17 and 39 are rendered non-conductive to terminate the supply of power to the load 11.

While certain preferred embodiments of the invention have been specifically illustrated and described it will be understood the invention is not limited thereto as many variations will be apparent to those skilled in the art and the invention is to be given its broadest interpretation within the terms of the following claims.

I claim:

1. A circuit for regulating power to a load from a source whose voltage alternates in polarity in cycles comprising:

capacitor voltage boost means coupled to said source, for storing power and for supplying power to said load at a voltage magnitude greater than the voltage of said source and at an appreciable voltage during a time when said source is alternating in polarity;

controlled gating means for connecting said voltage boost means to the load during part of each cycle of said alternating source which includes a time when said source is alternating in polarity; and second means connecting said source to said load for supplying power from said source to said load during a part of each cycle of said alternating source when said voltage boost means is not supplying power to the load.

2. The circuit described in claim 1 wherein:

said voltage boost means supplies a voltage substantially equal to the source voltage plus a an additional voltage; and said second means begins to supply power to said load at a predetermined time during each cycle; and including third means responsive to the voltage at said source for firing said controlled gating means at times when said second means is already supplying power, said third means firing said gating means at earlier or later times as said source voltage respectively decreases or increases, whereby to maintain a more constant load power.

3. The circuit described in claim 1 wherein:

said controlled gating means includes controlled rectifier means having a pair of main terminals respectivily connected to said voltage boost means and said load and having a gate, and timing circuit means for providing a firing voltage at said gate at a controlled time in each cycle of said source; and said voltage boost means supplies a voltage which falls to substantially zero at a time in each cycle, to allow said controlled rectifier means to turn off.

4. The circuit defined in claim 1 wherein:

both the said controlled gating means which connects the voltage boost means to the load and the said second means which connects the source to the load are controlled rectifiers, and including a timer circuit for rendering both of said controlled rectifiers nonconductive to cut off the supply of power to the load after a predetermined timed interval.

5. A circuit for maintaining substantially constant power from a source whose voltage alternates in cycles and which may fluctuate in value comprising:

a capacitor for storing a charge;

means for connecting said capacitor to said source to cyclically charge said capacitor;

first rectifier means connecting said source directly to the load during only a portion of each cycle of said source;

controlled rectifier means coupling said capacitor to the load during a portion of each cycle; and means rendering said controlled rectifier means conducting at a point in the cycle of said alternating source dependent on the fluctuating voltage thereof, so that the power supplied to the load is substantially constant regardless of such fluctuation.

6. The circuit defined in claim 5 wherein:

the outputs of said rectifier means are connected to a common point so that conduction of said controlled rectifier applies a higher voltage to discontinue conductance of said first rectifier means.

7. A circuit for regulating the power to a load from a source whose voltage across first and second lines thereof alternates in cycles comprising:

a capacitor;

means for connecting a first side of said capacitor to a first line of said source;

a first rectifier connecting a second side of said capacitor to a second line of said source;

controlled gating means having a first terminal connected to said second side of said capacitor, a second terminal connected to the load, and a control terminal;

control means coupled to said control terminal and responsive to said source for turning on said controlled rectifier means at a controlled point in each cycle of said source; and a second rectifier connecting said source to said load for supplying power to the load at substantially said source voltage during a part of each cycle when said capacitor is not supplying power to the load.

8. The circuit described in claim 7 wherein:

said control means turns on said controlled rectifer means at a phase of the cycle of said alternating source dependent on the voltage of said source so that the power supplied to the load is substantially constant regardless of fluctuations in the voltage of the source.

9. A circuit for providing a regulated power for a controlled time from an AC source comprising:

a capacitor;

means for charging said capacitor from said AC source;

first and second controlled rectifier means each having a gate control;

means for connecting said first rectifier means to said load to supply current directly from the AC source to the load;

means for connecting said second rectifier means between said capacitor and said load to discharge said capacitor through said load;

power regulating means coupled to the gate of said second rectifier means for firing said second rectifier means at a controlled phase of each cycle, to provide a regulated power; and timer means coupled to the gate of said first rectifier means and to said power regulating means for turning off both rectifier means at a controlled time.

10. A circuit for regulating power to a load from a source whose voltage alternates in polarity in cycles comprising:

voltage boost means coupled to said source, for storing power and for supplying power to said load at a voltage magnitude greater than the voltage of said source and at an appreciable voltage during a time when said source is alternating in polarity;

controlled rectifier means for connecting said voltage boost means to the load during part of each cycle of said alternating source which includes a time when said source is alternating in polarity;

second controlled rectifier means connecting said source to said load for supplying power from said source to said load during a part of each cycle of said alternating source when said voltage boost means is not supplying power to the load; and including a timer circuit for rendering both of said controlled rectifiers nonconductive to cut off the supply of power to the load after a predetermined timed interval.

* * * * *